(12) United States Patent
Stanich et al.

(10) Patent No.: US 6,337,958 B1
(45) Date of Patent: Jan. 8, 2002

(54) MATCHING THE PRINTING CHARACTERISTICS BETWEEN TWO ENGINES OF A DUPLEX PRINT SYSTEM

(75) Inventors: Mikel John Stanich; William Ashmead Courtenay Bateman, III; John Charles Wilson, all of Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/655,114

(22) Filed: Sep. 5, 2000

(51) Int. Cl.[7] .............................................. G03G 15/00
(52) U.S. Cl. ......................................... 399/49; 399/306
(58) Field of Search ........................... 399/15, 49, 299, 399/306; 358/406, 504

(56) References Cited

U.S. PATENT DOCUMENTS

| | | | |
|---|---|---|---|
| 5,267,727 A | 12/1993 | DeHority | 270/1.02 |
| 5,673,106 A | 9/1997 | Thompson | 399/9 |
| 5,710,957 A | 1/1998 | Acquaviva | 399/45 |
| 5,730,535 A | 3/1998 | Keller et al. | 400/605 |
| 5,837,408 A | 11/1998 | Parker et al. | 430/42 |
| 5,963,770 A | 10/1999 | Eakin | 399/364 |
| 5,970,304 A | 10/1999 | Stemmie | 399/364 |
| 5,978,615 A | * 11/1999 | Tanaka et al. | 399/49 |
| 6,034,711 A | * 3/2000 | Trask et al. | 399/49 X |
| 6,064,848 A | * 5/2000 | Haneda | 399/306 X |

FOREIGN PATENT DOCUMENTS

JP          11-024338       *  1/1999

* cited by examiner

Primary Examiner—Sophia S. Chen
(74) Attorney, Agent, or Firm—Ohlandt, Greeley, Ruggiero & Perle, LLP; Randal J. Bluestone, Esq., IBM Corporation

(57) ABSTRACT

A duplex printing system including two print engines arranged in tandem for printing a first and second density patch on a print medium, at least one density sensing device adapted for measuring the density of the first and second density patches printed on the print medium by the two print engines and a control for controlling the adjustment of the print engines to enable the density and dot gain of the print output of the first and the second print engines to match. The printing system of the present invention is further characterized by the measurement of the density of the density patch printed by each print engine after the print medium has advanced through the printing system. Thus, the print medium and first and second density patches printed by each print engine is subjected to the same conditions and influences as a print job processed by the printing system. Accordingly, density measurements and adjustments made to the print engines to vary the density of the print engine outputs will be realized in a print job subsequently produced by the printing system and the resultant print job will include printed images printed by two print engines that have matching print characteristics, namely matching density and dot gain.

25 Claims, 5 Drawing Sheets

TARGET DOT GAIN VALUES

| PERCENT OF DOT PRINTED | TARGET PERCENT DOT GAIN |
|---|---|
| 100.0 | 0 |
| 0.0 | 0 |
| 88.9 | 8.14 |
| 77.8 | 15.20 |
| 66.7 | 20.89 |
| 55.6 | 20.84 |
| 44.4 | 26.60 |
| 33.3 | 25.67 |
| 22.2 | 21.42 |
| 11.1 | 13.14 |

FIG.3

MATCHING THE PRINTING CHARACTERISTICS BETWEEN TWO ENGINES OF A DUPLEX PRINT SYSTEM

BACKGROUND OF THE INVENTION

1. Field of the Invention

The present invention relates to printers and printing systems and, more particularly to controlling and matching the printing characteristics of tandem print engines of a printing system.

2. Description of the Related Art

Various printers and printing systems use more than one print engine, where the print engines are typically arranged in tandem. A typical high speed duplex printing system uses two print engines. Each of the two print engines prints to one side of the print medium fed through the printing system. The two print engines are either each orientated within the printing system for printing on one side of the print medium and/or there is a mechanism for manipulating the print medium such that each side thereof is presented to the two print engines for printing. In this manner, the two print engines may efficiently and quickly produce a duplex print job (i.e., double sided copy) on the print medium. Ideally, the optical density (i.e., the darkness) of the duplex print job is the same on both sides of the print medium. However, a problem can result when the optical density of the image printed on one side of the print medium does not match the density of the image printed on the other side of the print medium.

Though generally known, a brief discussion of the typical duplex printer process will be explained to highlight some of the causes for print mismatches between print engines in a duplex printing system. In an electrophotographic (EP) print engine, a photoconductive drum is charged to a uniform potential whereupon light is then selectively transmitted in order to write a latent image of the print job image onto the photoconductive drum surface. The latent image is then developed by depositing, typically, a mixture of toner particles and triboelectrically charged carrier granules on the photoconductive drum. Due to differences in electrical potentials, the toner particles are attracted to the latent image formed on the photoconductive drum and thus form a latent image of toner particles on the drum. The toner particles, arranged in the form of the latent image, are then transferred to a print medium. The print medium is next heated to fuse the image onto the print medium. The print medium is then inverted for duplex printing. The print medium is then fed to the second print engine in the duplex printing system so that the process may be repeated for the second engine, whereby an image is printed on the second side of the print medium.

While the two print engines used in a duplex printer are typically identical to each other, there often exists differences in the print outputs produced by each of the two print engines. The differences in the print outputs from the two print engines can be attributed to differences between the print engines and the effect of the printing process on the print medium. Although the print engines are typically the same (i.e., same model number, etc.), differences in the print engine print outputs can still occur due to manufacturing differences and degradation of the print engines during use, both of which can impact performance of the print engines. Adjusting the print engines so that they each operate within the printer manufacturer's tolerances does not assure that the print output of each print engine will match the other.

For example, the printing process can introduce changes to the amount of toner transferred to the print medium due to heating of the print medium, due to variables in the transfer of the image to the print medium, and due to the spatial separation of the print engines and environmental changes experienced by the print medium as it is advanced through the printing system. These, and other influences, can affect the print output of a print engine in a printing system such the print output of one print engine in a printing system does not match the print output of another print engine in the printing system, i.e., a printing mismatch.

A printing mismatch between the print engines of a printing system is often manifested in density differences in the print job produced by a duplex printing system wherein the density of the image printed by one print engine differs from the density of the image produced by the other print engine. Compensation of printing mismatches can be applied using PostScript™ transfer functions, provided the data to be printed is contone. Binary data cannot be corrected using PostScript™ transfer functions. The printing of binary data and binary text is the focus of the present invention. Note however that after the print engines have been adjusted so that binary image and text printed by the print engines matches, it follows that contone data RIPed to binary data (i.e., using Raster Image Processing to convert data to binary data) using a single transfer function also matches when printed by the adjusted print engines.

Some previous printing systems have attempted to compensate for print mismatches in printing systems using tandem print engines by regulating the consistency of the density of the image to be printed. These previous systems however, measured the density of patches formed on the drum or transfer members during the EP process. These systems have the disadvantage of not accounting for the influences of the printing process and the transfer characteristics of the print engines on the print medium, factors that can cause changes to the resultant print job.

A printing system described in U.S. patent application Ser. No. 08/865,039, now U.S. Pat. No. 6,147,698 measures the density of the various colors printed by a color electrostatic printing system on a print medium and is controlled to adjust the print stations of the printer to bring the print stations within printer tolerances.

Accordingly it is an object of the present invention to provide a method and system for achieving matching print outputs from the print engines of the printing system.

It is another object of the present invention to provide a method and system for controlling the print engines of a printing system that measures the density of a print output on the print medium.

It is further object of the present invention to provide a method and system for controlling the print engines of a printing system wherein the density of the print outputs by the print engines is measured after the print medium has advanced substantially through the entire printing system.

It is another object of the present invention to provide a method and system for controlling the print engines of a printing system wherein each print engine produces print outputs of a consistent density.

It is still another object of the present invention to provide a method and system for controlling the print engines of a printing system wherein the print engines of the print system can be independently adjusted to achieve a desired print output density.

It is yet another objective of the present invention to provide a method and system for controlling the print engines of a printing system wherein the density of the print output produced is controlled preferably by adjusting the contrast and PQE (Print Quality Enhancement)boldness of the print engines.

It is a further object still of the present invention to provide a method and system for controlling the print engines of a printing system wherein the density of the print outputs from the print engines are efficiently and effectively matched by varying the factors that most influence the density of the print outputs.

SUMMARY OF THE INVENTION

A duplex printing system including two print engines arranged in tandem for printing a density patch on a print medium, at least one density sensing device adapted for measuring the density of the density patch printed on the print medium by the two print engines and a control means for controlling the adjustment of the print engines to enable the density of the print output of the first and the second print engines to match. The printing system of the present invention is further characterized by the measurement of the density of the density patch printed by each print engine after the print medium has advanced through the printing system. Thus, the print medium and density patch printed by each print engine is subjected to the same conditions and influences as a print job processed by the printing system. Accordingly, density measurements and adjustments made to the print engines to vary the density of the print engine outputs will be realized in a print job subsequently produced by the printing system and the resultant print job will comprise printed images printed by two print engines that have matching print characteristics, namely matching densities.

Although discussed herein primarily in the context of a printing system adapted for printing duplex print jobs, the printing system of the present invention is not limited to this, or any other, particular embodiment or application. As will be seen from the following detailed discussion, the system and methods of the invention are adaptable to printers, printing systems, copiers and other document producing devices having two print engines. The inventions is also applicable to printing systems and print jobs distributed over a network where the matching of the print output characteristics is also desirable.

BRIEF DESCRIPTION OF THE DRAWINGS

FIG. 3 is a tabular listing of percentage of dot printed values and related exemplary data gain percentage values;

DETAILED DESCRIPTION OF THE INVENTION

Figure 1:
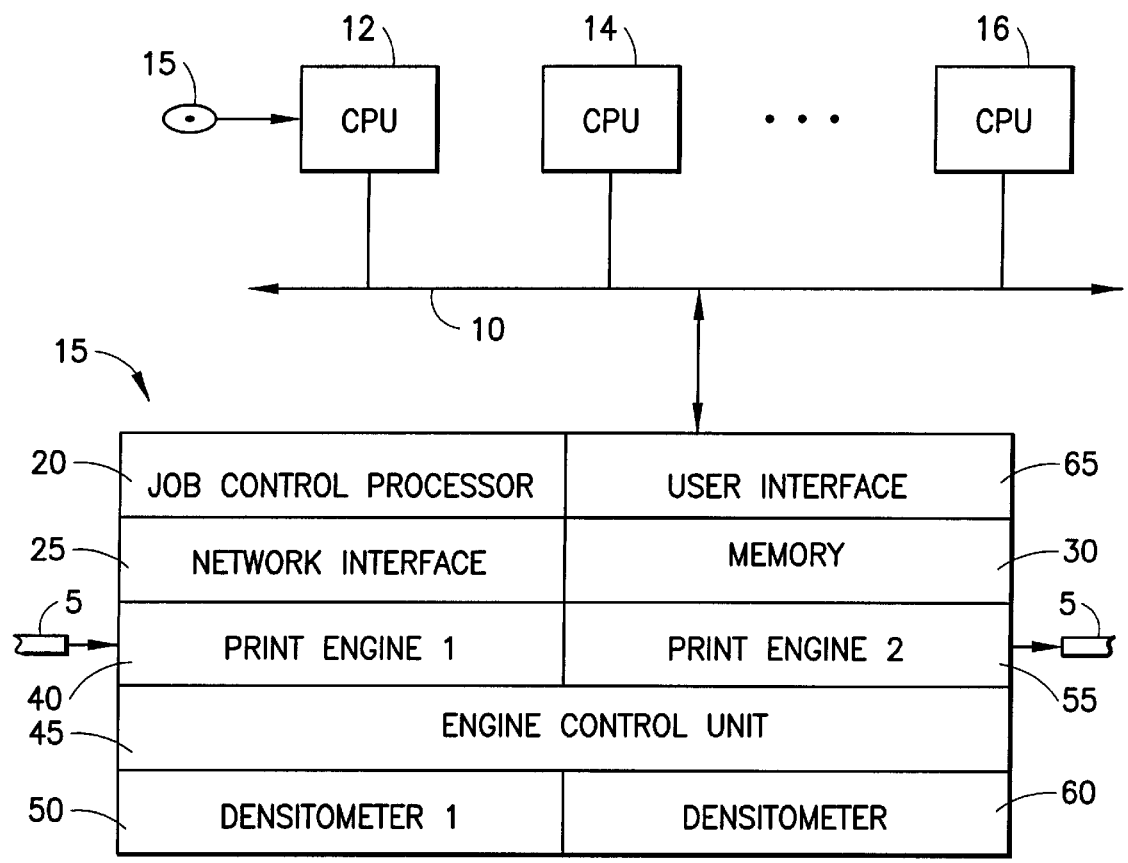
FIG. 1 is a block diagram of a printing system encompassing the present invention hereof.

Referring to FIG. 1, a printing system 15 embodying the present invention includes a job control processor 20, a user interface 65, a first print engine 40, second print engine 55, a first densitometer 50 for measuring the density of a print output of the first print engine 40 and a second densitometer 60 for measuring the density of a print output of the second print engine 55. The densitometers 50 and 60 measure the density of the print outputs of the first and second print engines 40 and 55, respectively. The density measurement of the print output of each print engine 40, 55 is arranged to be taken after the print medium 5 has advanced beyond both the first and the second print engines 40 and 55 and the transfer of the image to the print medium is substantially complete. Measurement of the density of the print output from each engine 40, 55 is taken from the print medium 5. In this manner, the print output of each print engine 40, 55 is subjected to all of the same printing processes and influences as a print job processed by the printing system 15 prior to taking a density measurement of the print engines' print output.

The print engines 40, 55 are arranged such that the print medium 5 exits the first print engine 40 and is then advanced to the second print engine 55. In a typical high speed duplex printing system, the print medium is a large continuous roll of paper that is often referred to as a print 'web'. To facilitate duplex printing there is a turnbar mechanism (not shown) in the printing system 15 between the print engines 40, 55 that inverts the print medium 5. Thus, the first print engine 40 prints to one side of the print medium 5, the print medium 5 is inverted for presentation to the second print engine 55 and the second print engine 55 prints to the second side of the print medium 5 to produce a duplex print job.

The memory 30 saves the print job information, printing parameters for the printing system 15 and the target density values, as will be more fully described below. The memory 30 saves print job data which is sent to each of the print engines 40, 55 at the appropriate time, taking into account the print medium's speed of advancement past the print engines 40, 55 and the spatial separation of the two print engines 40, 55.

In an optimal workflow to alleviate mismatches in a duplex print job due to printing differences in the print engines 40 and 55, the effects of the printing process on the print medium 5, and the cumulative effect of both, the densitometers 50 and 60 are controlled to measure the density of print outputs from the print engines 40 and 55 prior to the printing of a print job. The density measurements are taken from the print medium 5. The density measurements are taken after the second print engine 55 so that all of the factors that can impact the print image have already occurred. These factors typically include, but are not limited to, the printing processes of image fusing, transferring, and the like. In this manner, an accounting can be made for the transfer characteristics to the particular print medium 5 used and the differences in the image transfer between the first print engine 40 and the second print engine 55 due to the print medium drying from the fusing in the first print engine 55.

Each of the print engines 40, 55 are controlled by the engine control unit 45. The engine control unit 45 controls the print engines 40 and 55, respectively. The engine control units 45, controls to print density patches of a target density value on the print medium 5. The density of the density patches actually printed on the print medium 5 is then measured by the densitometers 50, 60. The print engine control unit 45 controls the densitometers to coordinate the density measuring process. In response to the measured density for the density test patch printed by each print engine, the contrast and PQE boldness parameters of each print engine 40, 55 are then variably adjusted. The contrast and PQE boldness parameters of each print engine 40, 55 are variably adjusted under control of the engine control unit 45, so that the print output of each print engine 40, 55 will match the target patch (solid area) density value and dot gain established for the density patch. By adjusting each print engine to achieve the target density value and dot gain for the density patch, each print engine will produce print consistent outputs of predictable densities.

Note that while the PQE boldness parameter is discussed herein, that other print enhancement techniques are also considered to fall within the scope and spirit of the present invention.

Figure 2:
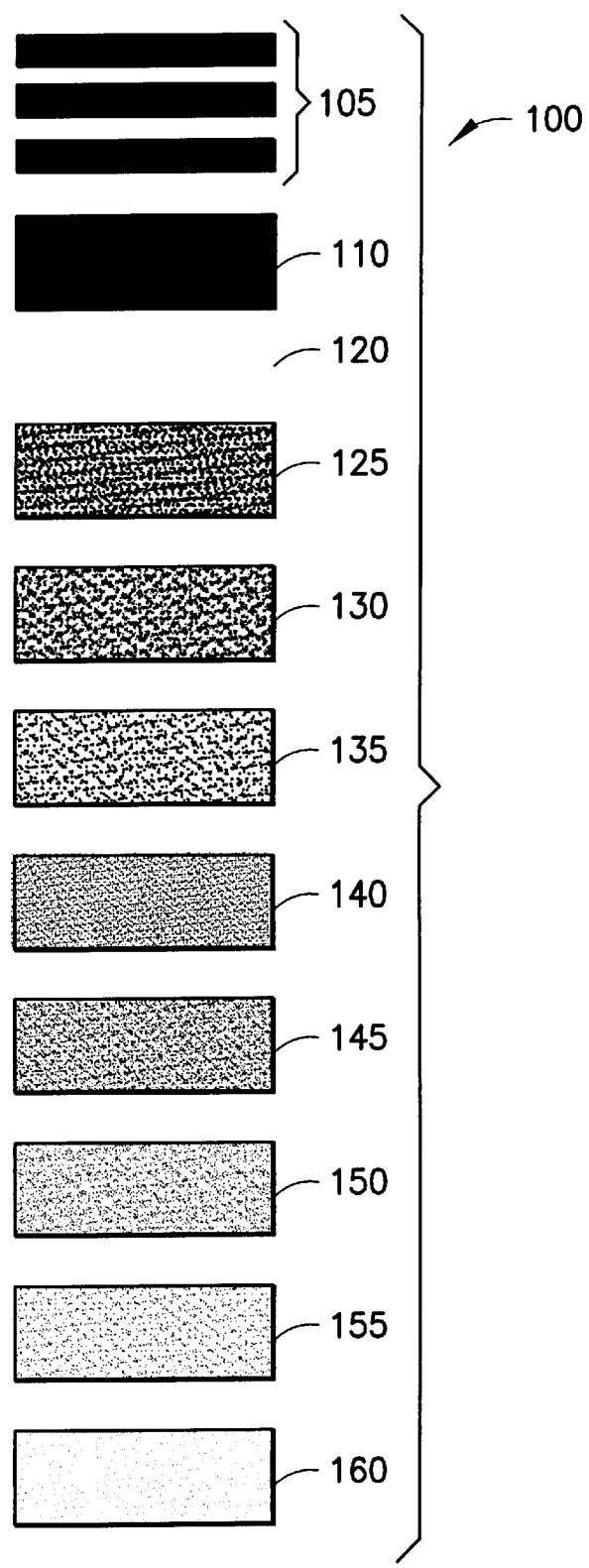
FIG. 2 is a depiction of a test pattern comprising a plurality of target densities used by the printing system of FIG. 1.

The density patch printed by each print engine 40, 55 is typically a density test pattern of at least one target density. FIG. 2 shows a preferred density test pattern 100. As shown, the density test pattern 100 comprises ten grayscale step wedges 110–160, each of a different specific density. A density patch of a single density may be used, but the density test pattern 100 depicted in FIG. 2 is a preferred embodiment since it comprises multiple grayscale step wedges having densities spanning the tonal range of a printer. The grayscale step wedges of the density test pattern 100 comprise grayscale step wedges having 0% dot printed (grayscale step wedge 120) to 100% dot printed (grayscale step wedge 110) and other densities in between (grayscale step wedges 125–160). The percentage of the dot printed for the dots comprising each grayscale step wedge of the density test pattern 100 is listed in the table provided in FIG. 3.

Referring back to FIG. 2, there are synchronization marks 105 located near the top of the density test pattern 100. The synchronization marks 105 are used by the densitometers 50, 60 to synchronize the density measuring process by the densitometers 50, 60 with the density test pattern 100 as the print medium 5, and thus the density test pattern 100 printed thereon, is advanced through the printing system 15 for measurement.

The density target value for the solid area 110 (100% dot) and the target dot gain of the density test pattern 100, as shown in FIG. 3, represent the ideal grayscale step wedges that should be achieved after adjustment of the print engines 40, 55. By adjusting each print engine of the printing system 15 to achieve the target values (density and dot gain), the printing characteristics of the print engines 40, 55 will also match also each other. Accordingly, the present invention preferably adjusts the contrast and the PQE boldness to vary the density and dot gain, respectively, of the print engine's print outputs.

The contrast parameter of a printer influences the darkness of a print output, i.e. how dark the printout is. An increase to the contrast parameter for a print engine increases the density of the print output. A decrease to the contrast parameter for a print engine decreases the density of the print output. The PQE boldness parameter of a printer controls the size or the dot gain of the dots comprising a print output. Increasing the PQE boldness increases the dot gain. Decreasing the PQE boldness decreases the dot gain. Accordingly, a tone curve including the density of the solid of the print output of the print engines 40, 55 can be adjusted by varying the contrast and PQE boldness the print engines 40, 55.

The densitometers 50, 60 measure the optical density of the density test pattern 100 printed by each print engine 40, 55. Densitometers typically measure the optical density of a print output on a print medium by measuring the reflectivity of light from the print output. The measured optical density is converted to dot gain. The engine control unit 45 typically handles the conversion from optical density measurements to dot gain. Dot gain is computed from the measured densities using the Murray-Davies equations familiar to those skilled in the art The preferred manner of density measurement is absolute density. The dot gains of the density test pattern 100 printed by the print engines 40, 55 are used by the engine control unit 45 to determine the amount, if any, of adjustment made to each print engine to enable each of the print engines 40, 55 to achieve the target values for the density test pattern 100. The objective is to independently adjust each print engine so that the print engines can achieve the specific values of dot gain over the tonal range of the printing system. As mentioned above, the density test pattern 100 is a preferred embodiment of the density patch since the density test pattern 100 provides grayscale step wedges of target values over the tonal range (0% to 100%) of the printing system 15. The dot gains computed from the measured densities are compared to the desired dot gains. An exemplary listing of desired target dot gain values is shown in FIG. 3. The differences in the measured and desired dot gains are reduced to a single merit factor. A merit factor greater than one indicates that the average dot gain is too large. Similarly, a merit factor less than one indicates that the average dot gain is too small.

Using specific density target values and dot gains, as shown, for example, in FIG. 3, and stored in memory 30, provides a degree of standardization so that after the adjustment of the print engines 40 and 55, the print output of one print engine will be consistent with the other. This is important for producing consistent, matched print outputs.

With reference to FIG. 1, the printing system 15 is illustrated connected to a network 10. The network 10 may be a LAN, or a WAN such as the Internet. The network interface 25 provides the necessary communication protocol to facilitate communication between the printer and other devices on the network 10 such as computers 12, 14 and 16. Though not shown, other printing systems embodying the present invention may also be connected to the network 10. If other printing systems embodying the present invention are connected to the network 10, then matching the print outputs from the various printing systems can be achieved by using the system and methods of the present invention. This capability can be used to produce print jobs having similar print characteristics by printing systems remotely located from each other.

It has been found that for a given printer, the optical density for a solid (FIG. 2, density patch 110) is preferably greater than 1.5 and the dot gain is preferably 27% for a 50% dot, considering the entire tonal range. For a dot gain of 27% and a 50% dot, the merit factor is equal to one (1.0). This produces a result largely independent of the print medium used.

Figure 4:
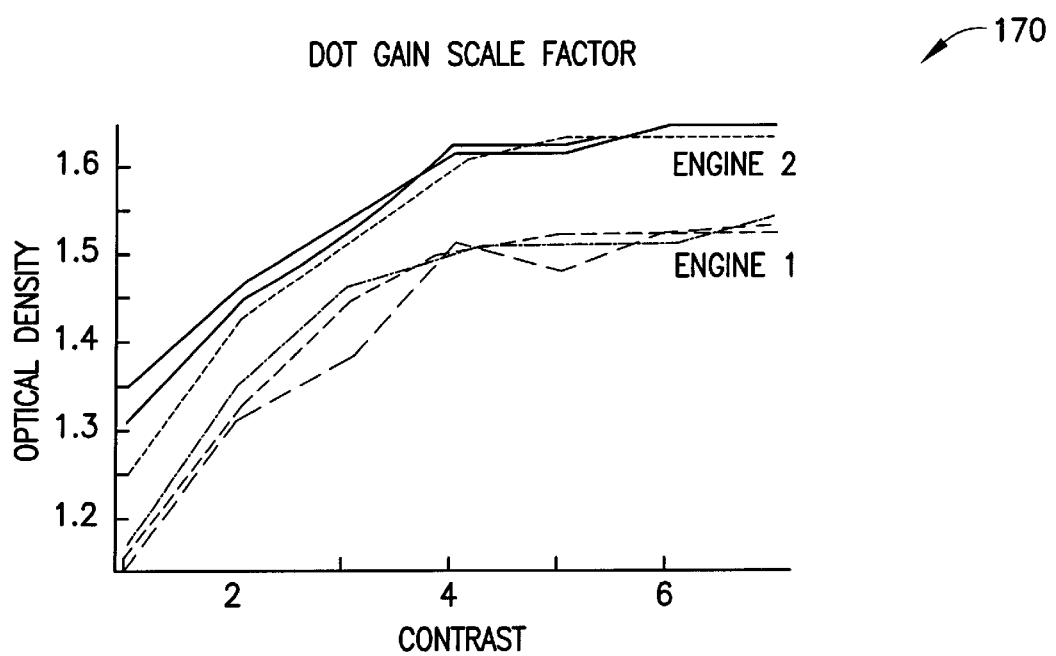
FIG. 4 is a graphical representation of a optical density and contrast relationship of the printing system of FIG. 1.

A graphical plot depicting the relationship between the density of an area printed by a print engine and the contrast setting of the print engine is shown in FIG. 4. In the graph 170, note that an increase in contrast setting for a print engine generally relates to an increase in the optical density of the area printed by the print engines, as expected.

Figure 5:
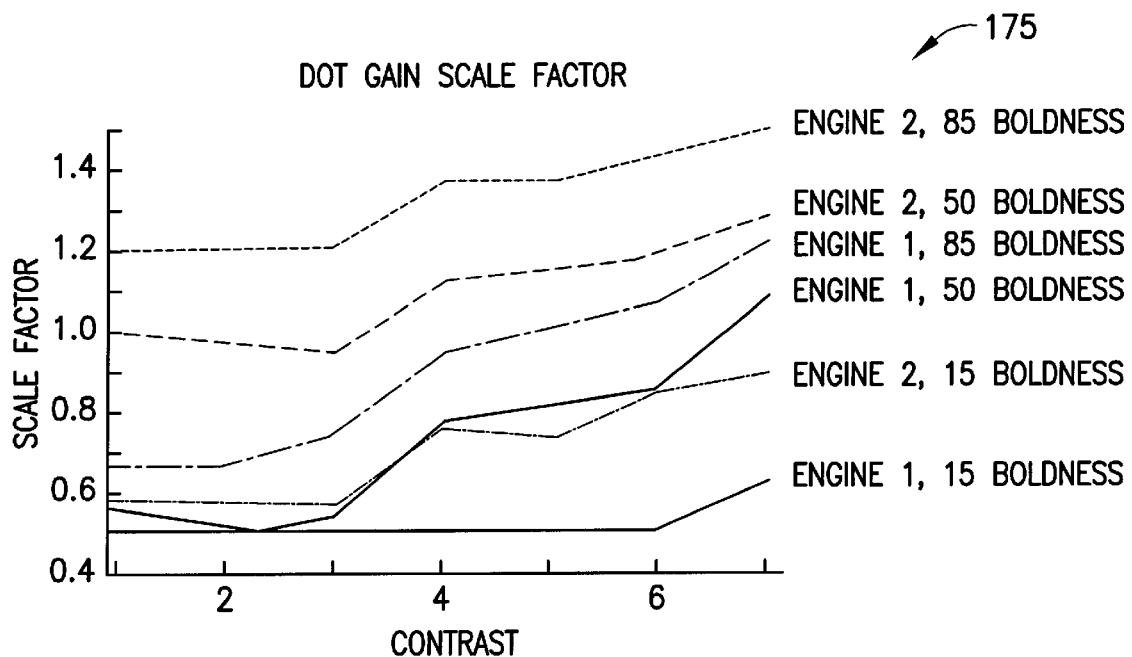
FIG. 5 is a graphical representation of a normalized dot gain, contrast and PQE (Print Quality Enhancement) boldness for the printing system of FIG. 1.

FIG. 5 is a graphical plot depicting the relationship between the normalized dot gain (i.e., dot gain merit factor), contrast and PQE boldness. As mentioned above, the PQE boldness increases or decreases the dot gain for the print engine's print output. Therefore, for a given print engine, a higher PQE boldness correlates to a higher dot gain. The plots 175 use dot gain scale factor units (equal to the dot gain merit factor) of measure for the dot gain. The dot gain scale factor is a normalized dot gain where a scale factor of 1.0 is the objective. A normalized scale factor of 1.0 correlates to a 27% dot gain. It has been found that print engines preferably match to within ±0.15 dot gain scale factor unit (±4% dot gain) of each other in order to be perceived as being visually matched. That is, print engines adjusted to produce print outputs having dot gain scale factors within ±0.15 dot gain scale factor units (±4% dot gain) of each other are perceived as being visually matched. Differences of this magnitude are imperceptible to the human eye.

Figure 6:
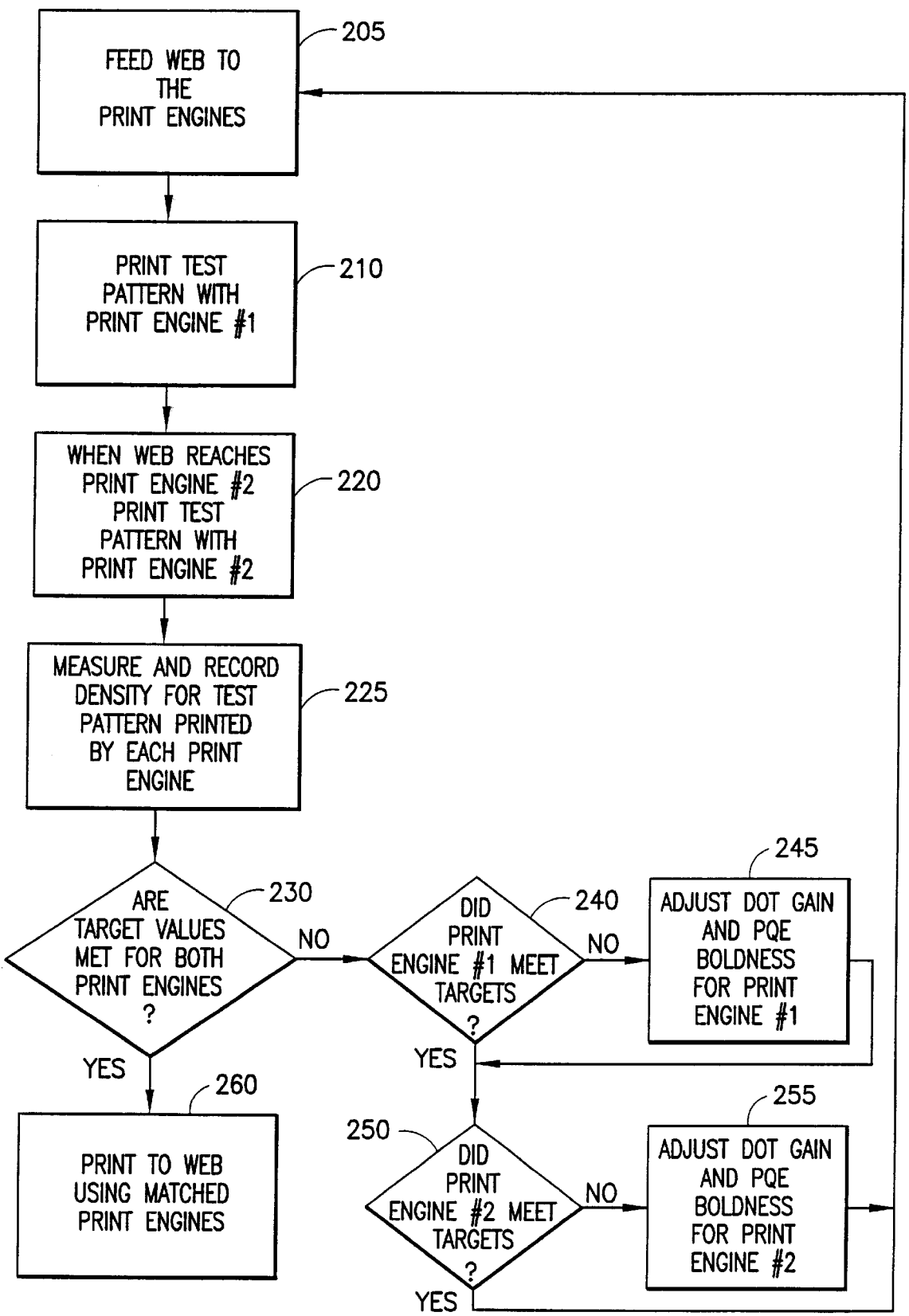
FIG. 6 is a logical flow diagram illustrating a method of the invention of FIG. 1.

With reference to FIG. 6, a method consistent with one aspect of the present invention is now discussed. The method starts when the print medium, for example, the web, is advanced through the printing system and placed in a position for the printing of a density test pattern thereupon (step 205). The density test pattern is then printed on a first side of the print web by a first print engine 40 (step 210), as commanded by the engine control unit 45. Preferably, the density test pattern comprises multiple grayscale step wedges of varied densities. The specific densities of the grayscale wedges comprising the density test pattern to be printed are stored in a memory 30 of the printing system. The continues print web is then advanced to the second print engine for printing of a density test pattern on a second side of the print web. The second print engine 55 is also controlled by the engine control unit 45 which commands it to print an image to the second side of the print web (step 220). The print web is subjected to the same print processes during the printing of the density test pattern as the print job that will ultimately be produce by the printing system undergoes.

After each print engine has printed the density test pattern to the print web, a measurement is made of the optical densities of the of the density test patterns actually printed by each of the print engines. The measurement is done after the print web has advanced beyond the second print engine and all of the printing processes impacting a print job have occurred (step 225). The optical density measurements are then typically recorded by the printer control processor into memory 30 and compared to the target values (i.e., the density values expected to be printed for the density test pattern and the dot gain merit factor) that are also stored in memory 30.

A determination is made for each engine whether the measured densities of the density test patterns actually printed on the print web match the target values expected (step 230). When it is determined that the first print engine 40 has failed to achieve the target values in step 240, the first print engine 40 is adjusted accordingly by varying the contrast setting and PQE boldness for the first print engine 40 (step 245). In one aspect of the invention, the contrast setting is increased until the solid area density target is exceeded. The required change to PQE boldness is typically assumed to be linearly related to the dot gain merit factor. The dot gain merit factor typically changes from 0.5 to 1.4 over the PQE boldness range of 15 percent to 85 percent.

At the same time the first print engine 40 is adjusted so that the first print engine will print the proper density and dot gain over the tonal range of the printing system, the second print engine 55 is similarly adjusted (steps 250 and 255). The measurement of the optical density of the density pattern made on the print medium by the second print engine 55 is taken by the second densitometer 60. Upon the adjustment of the second print engine 55, each of the print engines 40, 55 have been independently adjusted to compensate for mismatches in printing characteristics, namely density discrepancies.

In one aspect of the invention, as shown in FIG. 6, the printing (steps 205, 210 & 220), measurement (step 225) and adjustment of the contrast setting and PQE boldness for the print engines 40 and 55 (steps 230–255) is done recursively until the print outputs of the print engines 40 and 55 of the tandem print system match.

Once the print engines have been properly adjusted and a match is declared (step 230) then the print job is produced by the printing system using the adjusted print engines "(step 260)."

It should be understood that the foregoing description is only illustrative of the invention. Various alternatives and modifications can be devised by those skilled in the art without departing from the invention. For example, the printing system may employ an engine control unit that is incorporated into the job control processor. Such modifications, such as including instructions on a storage media such as, for example, a CD-ROM or disk or semiconductor memory that is readable by a processor for carrying out the methods of the present invention are to be construed as lying within the scope of the present invention, as defined by the appended claims.

What is claimed is:

1. A duplex printing system for matching printing characteristics between two print engines of the printing system, said printing system comprising:

a first print engine for printing a first density patch on a print medium;

a second print engine for printing a second density patch on said print medium;

at least one density sensing device adapted for measuring the density of each of said first and second density patches printed on said print medium by each of said first and said second print engines to derive a first density measurement and a second density measurement, respectively; and a data processor responsive to an output of said at least one density sensing device for adjusting each of said first and said second print engines such that the density and dot gain of a print output of said first print engine and a density and dot gain of a print output of said second print engine are substantially equal.

2. The printing system of claim 1 wherein said data processor selectively and independently adjusts said first print engine and said second print engine such that said print output of each of said first and said second print engines is substantially equal to an associated desired density target value and a dot gain target value.

3. The printing system of claim 1 wherein said data processor selectively and independently adjusts a contrast parameter of said first and said second print engines, wherein the density of a solid is affected.

4. The printing system of claim 1 wherein said data processor selectively and independently adjusts a Print Quality Enhancement (PQE) boldness parameter of said first and said second print engines, wherein the dot gain of said first and said second print engines are affected.

5. The printing system of claim 1 wherein said first and second density patch each comprises a density test pattern of at least one target density.

6. The printing system of claim 5 wherein said first and second density test pattern each comprises a plurality of target densities.

7. The printing system of claim 6 wherein said plurality of target densities comprises a range of density tones.

8. The printing system of claim 1 wherein said printing system comprises two density measuring devices for selectively and independently measuring the density of said first density patch and said second density patch.

9. The printing system of claim 1 wherein said first print engine prints on a first side of said print medium and said second print engine prints on a second side of said print medium.

10. The printing system of claim 1 wherein said density sensing device comprises a densitometer.

11. A method for matching printing characteristics between print engines of a duplex printing system, said method comprising the steps of:
- printing a first density patch on a print medium by a first print engine;
- printing a second density patch on said print medium by a second print engine;
- measuring the density of each of said first and second density patches printed on said print medium by each of said first and said second print engines to derive a first density measurement and a second density measurement, respectively; and
- adjusting each of said first and second print engines such that the density and dot gain of a print output of said first print engine and second print engine are substantially equal.

12. The method of claim 11 wherein said step of adjusting said print engines comprises selectively and independently adjusting said first print engine and said second print engine such that said print output of each of said first and said second print engines is substantially equal to an associated desired density target value and a dot gain target value.

13. The method of claim 11 wherein said step of adjusting said print engines comprises selectively and independently adjusting a contrast parameter of said first print engine and said second print engine.

14. The method of claim 11 wherein said step of adjusting said print engines comprises selectively and independently adjusting a Print Quality Enhancement (PQE) boldness parameter of said first print engine and said second print engine.

15. The method of claim 11 wherein said step of printing said first density patch and said step of printing said second density patch comprises printing a density test pattern of at least one target density for said first print engine and said second print engine, respectively.

16. The method of claim 15 wherein each of said first and second density test patterns comprises a plurality of target densities.

17. The method of claim 16 wherein said plurality of target densities comprises a range of density tones.

18. The method of claim 11 wherein said step of measuring the density of said first and second density patches printed on said print medium is executed subsequent to the printing of said first density patch and said second density patch.

19. The method of claim 11 wherein said step of measuring the density of said first and second density patches comprises using a sensing device comprising a densitometer.

20. The method of claim 11 wherein the steps of printing comprises printing on one side of said print medium by said first print engine and printing on a second side of said print medium by said second print engine.

21. A storage media including computer readable program instructions for controlling a duplex printing system for matching printing characteristics between two print engines of said printing system, said storage media comprising:
- program instructions for controlling a first print engine to print a first density patch on a print medium;
- program instructions for controlling a second print engine to print a second density patch on said print medium;
- program instructions for controlling at least one device for measuring the density of each of said first and second density patches printed on said print medium by each of said first and said second print engines to derive a first density measurement and a second density measurement, respectively; and
- program instructions for controlling an adjustment of said first print engine and said second print engine in response to an output of said at least one density measuring device such that the density and dot gain value of a print output of said first print engine and the density and dot gain value of a print output of said second print engine are substantially equal.

22. The storage media of claim 21 comprising program instructions selectively and independently controlling the adjustment of said first print engine and said second print engine such that said print output of said first and said second print engines is substantially equal to an associated desired density target value and a dot gain target value.

23. The storage media of claim 21 comprising program instructions for controlling the selective and independent adjustment of a contrast parameter of said first and said second print engines.

24. The storage media of claim 21 comprising program instructions for controlling the selective and independent adjustment of a Print Quality Enhancement (PQE) boldness parameter of said first and said second print engines.

25. The storage media of claim 21 comprising program instructions for controlling said first print engine and said second print engine such that said first print engine prints on a first side of a print medium and said second print engine prints on a second side of said print medium.

* * * * *